(12) United States Patent
van der Veen et al.

(10) Patent No.: US 10,929,178 B1
(45) Date of Patent: Feb. 23, 2021

(54) SCHEDULING THREADS BASED ON MASK ASSIGNMENTS FOR ACTIVITIES

(71) Applicant: Apple Inc., Cupertino, CA (US)

(72) Inventors: Peter H. van der Veen, Ottawa (CA); Shawn R. Woodtke, Richmond (CA); Stephen J. McPolin, Nepean (CA)

(73) Assignee: Apple Inc., Cupertino, CA (US)

( * ) Notice: Subject to any disclaimer, the term of this patent is extended or adjusted under 35 U.S.C. 154(b) by 472 days.

(21) Appl. No.: 16/071,634

(22) PCT Filed: Jun. 26, 2018

(86) PCT No.: PCT/US2018/039587
§ 371 (c)(1),
(2) Date: Jul. 20, 2018

(87) PCT Pub. No.: WO2019/005860
PCT Pub. Date: Jan. 3, 2019

Related U.S. Application Data

(60) Provisional application No. 62/526,317, filed on Jun. 28, 2017.

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/321* (2013.01); *G06F 9/4812* (2013.01); *G06F 9/546* (2013.01)

(58) Field of Classification Search
CPC ...... G06F 9/4881; G06F 9/321; G60F 9/4812; G60F 9/546
See application file for complete search history.

(56) References Cited

U.S. PATENT DOCUMENTS 6,243,736 B1 * 6/2001 Diepstraten .......... G06F 9/4843
718/103
7,404,203 B2 7/2008 Ng
7,490,333 B2 2/2009 Grimaud et al.

FOREIGN PATENT DOCUMENTS

EP 2306313 A1 4/2011

OTHER PUBLICATIONS

Graham Hamilton, Panos Kougiouris; "The Spring Nucleus: A Microkernel for Objects," SMLI TR-93-14 the SMLI Technical Report Series, Sun Microsystems Laboratories, Inc. Mountain View, CA 94043 USA Apr. 1993, 15 pages.

(Continued)

*Primary Examiner* — Wissam Rashid
(74) *Attorney, Agent, or Firm* — Kowert, Hood, Munyon, Rankin & Goetzel, P.C.; Lawrence J. Merkel

(57) ABSTRACT

In an embodiment, an operating system for a computer system assigns each independently-schedulable code sequence to an activity. An activity may thus be associated with a group of related code sequences, such as threads that communicate with each other (whether or not they are part of the same program). When a code sequence is ready to be scheduled and it is not part of the current activity, it may preempt the current activity if the activity for the code sequence is not enabled and is not masked by the enabled activities. Each activity may define which other activities it masks. A flexible scheduling scheme may be devised based on the mask assignments for each activity.

20 Claims, 9 Drawing Sheets

(51) Int. Cl.
  *G06F 9/32*    (2018.01)
  *G06F 9/54*    (2006.01)

(56) References Cited

OTHER PUBLICATIONS

QNX Neutrino RTOS System Architecture, QNX Software Development Platform 6.6., QNX Software Systems Limited, 1001 Farrar Road, Ottawa, Ontario, K2K 0B3 Canada, printed from internet, Feb. 20, 2014 324 pages.
Mach: A New Kernel Foundation for UNIX Development; Mike Accetta, Robert Baron, William Bolosky, David Golub, Richard Rashid, Avadis Tevanian and Michael Young Computer Science Department, Carnegie Mellon University Pittsburgh, Pa. 15213, Apr. 1986, 16 pages.
http://www.oracle.com/technetwork/indexes/documentation/index.html, Sun Microsystems, Inc. 901 San Antonio Road Palo Alto, CA 94303-4900 U.S.A. Documentation Home, ChorusOS 5.0 Features and Architecture Overview,Chapter 2 Architecture and Benefits of the ChorusOS Operating System, printed from the internet, Dec. 18, 2017, 17 pages.
ISR/WO, PCT/US2018/039587, mailed Nov. 7, 2018, 12 pages.
Small, C et al. ; "A revisitation of kernel synchronization schemes", Proceedings of the UAENIX Conference, XX, XX, Jan. 6, 1997 (Jan. 6, 1997), pp. 31-41.
IPRP, PCT/US2018/039587, mailed Jan. 9, 2020, 7 pages.

\* cited by examiner

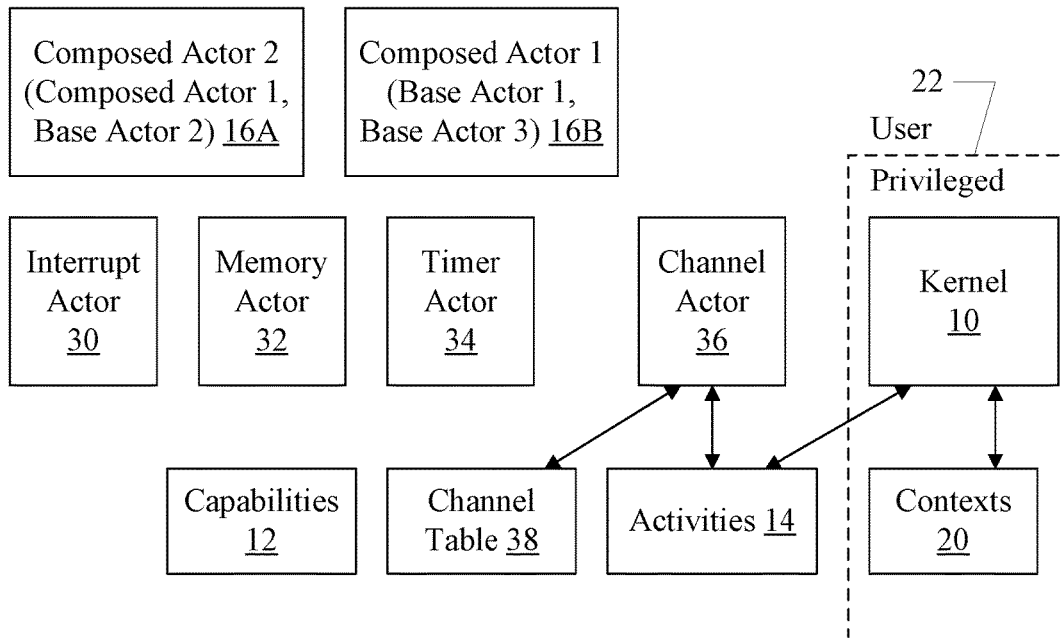
Fig. 1
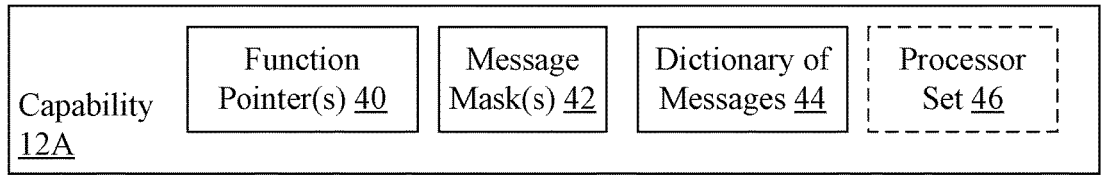
Fig. 2
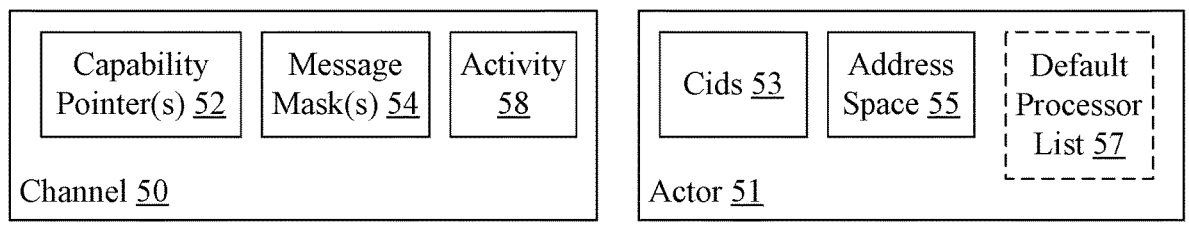
Fig. 3                              Fig. 4 ically, to operating systems on such elec-
SCHEDULING THREADS BASED ON MASK ASSIGNMENTS FOR ACTIVITIES This application is a 371 of PCT Application No. PCT/US2018/039587, filed Jun. 26, 2018, which claims benefit of priority to U.S. Provisional Patent Application Ser. No. 62/526,317, filed on Jun. 28, 2017. The above applications are incorporated herein by reference. To the extent that any material in the incorporated application conflicts with material expressly set forth herein, the material expressly set forth herein controls.

BACKGROUND

Technical Field

This disclosure relates generally to electronic systems and, more particularly, to operating systems on such electronic systems.

Description of the Related Art

Most electronic systems (e.g. computing systems, whether stand alone or embedded in other devices) have a program which controls access by various other code executing in the system to various hardware resources such as processors, peripheral devices, memory, etc. The program also schedules the code for execution as needed. This program is typically referred to as an operating system.

Typical operating systems schedule programs (represented by a single thread, multiple independently-schedulable threads, or one or more processes) for execution on the processors in the system. The scheduling algorithm generally relies on a static priority between schedulable code, or performs an equal sharing of the processors using a round robin approach or the like.

SUMMARY

In an embodiment, an operating system for a computer system assigns each independently-schedulable code sequence to an activity. An activity may thus be associated with a group of related code sequences, such as threads, that communicate with each other or otherwise interact (whether or not they are part of the same program). When a code sequence is ready to be scheduled and it is not part of the current activity, it may preempt the current activity if the activity for the code sequence is not enabled and is not masked by the enabled activities. Each activity may define which other activities it masks. A flexible scheduling scheme may be devised based on the mask assignments for each activity.

For example, two activities may be defined which mask each other. Either activity may occur first in time order, and may mask the other activity. Thus, neither activity may be strictly higher priority than the other, but the two activities may be mutually exclusive. The scheduling mechanism based on the activities and activity masks may offer significant flexibility in determining which activities may be scheduled based on the currently-active set of activities.

BRIEF DESCRIPTION OF THE DRAWINGS

The following detailed description makes reference to the accompanying drawings, which are now briefly described.

FIG. 1 is a block diagram of one embodiment of an operating system in accordance with this disclosure.

FIG. 2 is a block diagram of one embodiment of a capability.

FIG. 3 is a block diagram of one embodiment of a channel.

FIG. 4 is a block diagram of one embodiment of an actor.

Figure 5:
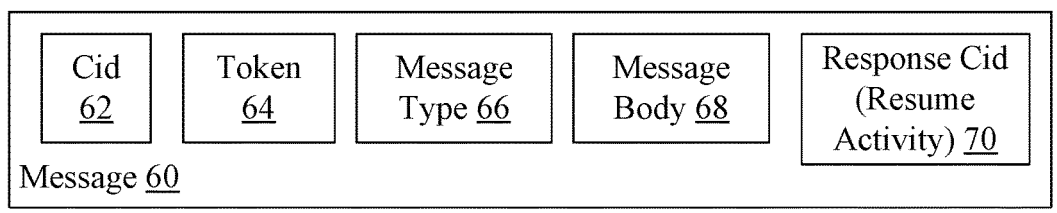
FIG. 5 is a block diagram of one embodiment of a message transmitted between actors.

While this disclosure may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure. Generally, this disclosure is not intended to refer to one particular implementation, but rather a range of embodiments that fall within the spirit of the present disclosure, including the appended claims.

DETAILED DESCRIPTION OF EMBODIMENTS

An example embodiment is discussed below in which activations of actors are scheduled according to associated activity values. In general, the code executed in a given system may include multiple independently-schedulable code sequences. An independently-schedulable code sequence may be any code sequence that is capable of being executed on a processor even if other code sequences are not currently executing (including code sequences with which the independently-schedulable code sequence may interact, e.g. by messages between the sequences). Thus, an independently-schedulable code sequence may be a single-threaded program, a thread from a multi-threaded program, a process, etc. An actor may be an example of an independently-schedulable code sequence, but any other independently-schedulable code sequence may be used.

Each code sequence may have an associated activity value. Code sequences having the same activity value may be grouped to perform a particular operation, and may be said to be part of the same activity. The activity value may represent the activity and may be an indication. For example, the activity value may be a positive integer. When one of the code sequences is executable (because the activity value is not masked), the related code sequences may also be executable.

A code sequence having a different activity value than a current activity value that corresponds to currently executing code sequence may preempt the currently executing code sequence. That is, there may be no inherent priority of one activity value over another activity value. Each activity value may have an associated activity mask, which may establish which activity values are masked when that activity value is enabled (e.g. at least one code sequence associated with the activity value is currently executing or is suspended due to preemption by another activity value). An activity mask may be a mask (e.g. a bit mask) with indications (e.g. bits) for each activity value. The activity corresponding to the activity mask may mask other activities having other activity values according to the corresponding indications in the activity mask. If its activity value is masked, the activity may be referred to as masked. An enabled activity/activity value may have at least one associated code sequence in execution or suspended. An activity/activity value that is not enabled may be referred to as disabled. The current mask for the system at a given point in time may be the union of the masks for the enabled activity values. Code sequences associated with masked, disabled activities may not be scheduled until termination of other code sequences causes the activity to be unmasked. In an embodiment, an indication of a code sequence for which a message is pending and which is associated with a masked, disabled activity may be placed in a pending queue for reevaluation when the system mask is changed. The pending queue may be a "prescheduling" queue, holding indications of code sequences that are awaiting scheduling when their activities are unmasked.

Thus, a masked activity value may be an activity value for which corresponding code sequences are prevented from being scheduled, even if they would otherwise be available for scheduling. While activity masks are used in the present embodiment, any indication of which activity values should be inhibited from scheduling when the corresponding activity value becomes enabled may be used. For example, a vector of activity values may be used, a table of activity values, a list of activity values, or any other indication.

When a code sequence is otherwise eligible for scheduling, the activity corresponding to the code sequence is not masked, and its activity value is disabled, the scheduling code sequence may preempt the current activity to enable the activity value and begin executing a code sequence associated with the now-enabled activity value. An indication of the code sequence that caused the preemption may be placed in a queue for that activity level (and may be at the head of the queue). On the other hand, if the code sequence is otherwise eligible for scheduling and its activity value is enabled, the code sequence may be scheduled (e.g., an indication of the code sequence may be placed in a queue for that activity value). If the activity value is the current activity in the system, the code sequence may subsequently be executed. If the activity value is not the current activity, it may eventually become the current activity as other activities become disabled. When the corresponding activity becomes the current activity, the code sequence may be executed.

Turning now to FIG. 1, a block diagram of one embodiment of an operating system and related data structures is shown. In the illustrated embodiment, the operating system includes a kernel 10, a set of capabilities 12, a set of base actors, and a set of composed actors 16A-16B. The base actors, in this embodiment, may include an interrupt actor 30, a memory actor 32, a timer actor 34, and a channel actor 36. Other embodiments may include other base actors, including subsets or supersets of the illustrated base actors and/or other actors. The kernel 10 may maintain one or more contexts 20. The channel actor 36 may maintain a channel table 38 and an activities data structure 14. There may be any number of base actors and composed actors in a given embodiment.

Each capability 12 includes a function in an address space that is assigned to the capability 12. The data structure for the capability 12 may include, e.g., a pointer to the function in memory in a computer system. In an embodiment, a given capability 12 may include more than one function. In an embodiment, the capability 12 may also include a message mask defining which messages are permissible to send to the capability 12. A given actor which employs the capability 12 may further restrict the permissible messages, but may not override the messages which are not permissible in the capability 12 definition. That is, the capability 12 definition may define the maximum set of permissible messages, from which a given actor may remove additional messages. While message masks are used in some embodiments, any mechanism for identifying valid messages for the capability and further restricting messages in a given actor may be used. The union of the permitted messages may be the permitted messages in the given actor.

Each base actor 30, 32, 34, and 36 may employ one or more capabilities 12. A given actor may employ any number of capabilities, and a given capability may be employed by any number of actors. Because actors 30, 32, 34, and 36 directly employ capabilities 12 and do not include other actors, the actors 30, 32, 34, and 36 may be referred to as base actors. The base actors may provide the low level functions of the operating system. Other actors may be composed actors, such as the actors 16A-16B. Composed actors 16A-16B may be assembled from other actors, either base actors or other composed actors. Any amount of assembly may be permitted in various embodiments (e.g. composed actors may include other actors that are themselves composed actors, which may further include actors that are themselves composed actors, etc.). In an embodiment, a composed actor 16A-16B may employ additional capabilities 12 as well. In an embodiment, the operating system disclosed herein may be viewed as a lightweight capability system, as the structure to access the capability may simply be one or more pointers to the capability function. This differs from the use of keys and tree spanning access methods that some capability-based systems use.

Accordingly, an actor may generally be defined as a container for one or more capabilities, either directly employed or employed via the inclusion of another actor. A container may be any type of data structure, class, data type, etc. that can store data allowing the capabilities to be accessed/executed. For example, a data structure with pointers to capabilities (or to other actors which point to the capabilities in a pointer chain) may be one form of container. More generally, a container may be any structure that organizes a group of objects in a defined way that follows specific access rules. In an embodiment, actors may be compiled into the operating system and may be optimized to limit the number of exceptions that may occur (e.g. by merging code into the actor, allowing some or all of the actor to execute in privileged space, etc.). When the code is merged together, the exception in the code one actor that would have lead to execution of code in another actor may be eliminated since the code has been merged. However, the model that the system is designed to may be that the actor is a container and may be proven to be safe and stable. Then, the compiled version may be shown to be equivalent to the model and thus also safe and stable. Safety and stability may be critical in certain products in which the operating system may be employed. For example, the operating system may be in a computing system that is embedded in the product. In one particular case, the product may be a vehicle and the embedded computing system may provide one or more automated navigation features. The vehicle may include many include any type of vehicle such as an aircraft, boat, automobile, recreational vehicle, etc. In some embodiments, the automated navigation features may automate any portion of navigation, up to and including fully automated navigation in at least one embodiment, in which the human operator is eliminated. Safety and stability may be key features of such an operating system. Additionally, security of the operating system may be key in such cases, as an attack which disables or destabilizes the system may disable the vehicle or possibly even cause a crash. In a traditional monolithic kernel operating system, the one operating system entity (the kernel) is responsible for all functions (memory, scheduling, I/O, time, thread management, interrupts, etc.). Any compromise in any of the functions could compromise the whole system. In the present operating system, however, the entities are separated and communicate via channels that do not permit compromise. Each entity may be provided with as much privileged and as needed to complete its operation. Thus, a compromise of one entity may not compromise the system and the leakage of privileged that often occurs in the monolithic kernel is not possible.

In an embodiment, the operating system may be a real time operating system that is designed to complete tasks within specified time intervals, so that the system may respond quickly enough to manage events that are occurring in "real time" (e.g. without undue buffering or other delays).

For example, in the automated navigation functions mentioned above, the system may be able to react quickly enough to inputs in order to effectuate corresponding automated navigation outputs to keep the vehicle operating in a safe manner.

The dotted line 22 divides the portion of the operating system that operates in user mode (or space) and the portion that operates in privileged mode/space. As can be seen in FIG. 1, the kernel 10 is the only portion of the operating system that executes in the privileged mode in this embodiment. The remainder of the operating system executes in the user mode. Privileged mode may refer to a processor mode (in the processor executing the corresponding code) in which access to protected resources is permissible (e.g. control registers of the processor that control various processor features, certain instructions which access the protected resources may be executed without causing an exception, etc.). In the user mode, the processor restricts access to the protected resources and attempts by the code being executed to change the protected resources may result in an exception. Read access to the protected resources may not be permitted as well, in some cases, and attempts by the code to read such resources may similarly result in an exception. Because most of the operating system executes in the user space, the user mode protections may apply. Thus, "privilege leak," where privileged code that is expected to access only certain protected resources but actually accesses others through error or nefarious intent, may be much less likely in the disclosed embodiments. Viewed in another way, each entity in the system may be given the least amount of privileged possible for the entity to complete its intended operation.

Moreover, the kernel 10 may be responsible for creating/maintaining contexts 20 for actors, but may include no other functionality in this embodiment. Thus, in an embodiment, the kernel 10 may be viewed as a form of microkernel. The contexts 20 may be the data which the processor uses to resume executing a given code sequence. It may include settings for certain privileged registers, a copy of the user registers, etc., depending on the instruction set architecture implemented by the processor. Thus, each actor may have a context (or may have one created for it by the kernel 10, if it is not active at the time that another actor attempts to communicate with it).

In the embodiment of FIG. 1, the channel actor 36 may be responsible for maintaining the activity associations for the operating system, as well as managing channels as described in more detail below. In other embodiments, a separate actor may be defined to manage the activities. The activity data structure 14 may be a data structure storing activity information, various activity queues, etc.

The interrupt actor 30 may be responsible for handling interrupts in the system (e.g. interrupts asserted by devices in the system to the processor, or processor's assertions to other processors). In an embodiment, the interrupt actor 30 may be activated by the kernel 10 in response to interrupts (as opposed to exceptions that occur within a processor in response to internal processor operation/instruction execution). The interrupt actor 30 may gather information about the interrupt (e.g. from an interrupt controller in the computing system on which the operating system executes, interrupt controller not shown) and determine which actor in the system should be activated to respond to the interrupt (the "targeted actor" for that interrupt). The interrupt actor 30 may generate a message to the targeted actor to deliver the interrupt. In an embodiment, the interrupt actor 30 may have its own activity since it is not clear which actor (and thus which activity) will receive an interrupt when the interrupt occurs.

The memory actor 32 may be responsible for managing memory, providing access to memory when requested by other actors and ensuring that a given memory location is only assigned to one actor at a time. The memory actor 32 may operate on physical memory. Other actors may be implemented to, e.g., provide a virtual memory system. Such actors may use the memory actor 32 to acquire memory as needed by the virtual memory system. That is, such actors may be composed actors that incorporate the memory actor 32 and other functions (e.g. capabilities, or capabilities in other actors).

The timer actor 34 may be responsible for implementing a timer in the system. The timer actor 34 may support messages to read the timer, set an alarm, etc.

The channel actor 36 may be responsible for creating and maintaining channels between actors. Channels may be the communication mechanism between actors for control messages. Data related to the control messages may be passed between actors in any desired fashion. For example, shared memory areas, ring buffers, etc. may be used.

In an embodiment, an actor may create a channel on which other actors may send the actor messages. The channel actor 36 may create the channel, and may provide an identifier (a channel identifier, or Cid) to the requesting actor. The Cid may be unique among the Cids assigned by the channel actor 36, and thus may identify the corresponding channel unambiguously. The requesting actor may provide the Cid (or "vend" the Cid) to another actor or actors, permitting those actors to communicate with the actor. In an embodiment, the requesting actor may also assign a token (or "cookie") to the channel, which may be used by the actor to verify that the message comes from a permitted actor. That is, the token may verify that the message is being received from an actor to which the requesting actor gave the Cid (or another actor to which that actor passed the Cid). In an embodiment, the token may be inaccessible to the actors to which the Cid is passed, and thus may be unforgeable. For example, the token may be maintained by the channel actor 36 and may be inserted into the message when an actor transmits the message on a channel. Alternatively, the token may be encrypted or otherwise hidden from the actor that uses the channel. In an embodiment, the token may be a pointer to a function in the channel-owning actor (e.g. a capability function or a function implemented by the channel-owning actor).

The channel actor 36 may track various channels that have been created in a channel table 38. The channel table 38 may have any format that permits the channel actor to identify Cids and the actors to which they belong. When a message having a given Cid is received from an actor, the channel actor 36 may identify the targeted actor (the actor that is to receive the message) via the Cid. The channel actor 36 may request activation of the targeted actor and may relay the message to the targeted actor.

In an embodiment, each actor/capability within an actor may be activated to respond to a given message. The activation may be associated with a context 20, which may be created for the activation if a context for the actor does not yet exist in the contexts 20. Once the activation has completed processing the message, the actor may dissolve, or dematerialize, or destroy itself. The dissolving may include deleting the context and closing the thread. In other embodiments, threads may be created for each actor/capability. The threads may block, but remain live in the system, after completing processing of a message. Accordingly, the thread may be initialized already, and may have a context 20, when a given message is received for that thread to processor. Unless expressly tied to activation/dissolution herein, various features disclosed herein may be used with the longer-living threads. In such embodiments, an activation may be similar to unblocking a thread and a dissolve may be similar to blocking a thread.

In another embodiment, one or more of the base actors (e.g. one or more of the actors 30, 32, 34, and 36) may execute in the privileged mode/space (e.g. on the same side of the dotted line 22 as the kernel 10 in FIG. 2).

FIG. 2 is a block diagram of one embodiment of a capability 12A, which may be one of the capabilities 12 shown in FIG. 1. The capability 12A includes a function pointer or pointers 40, a message mask or masks 42, a dictionary of messages 44, and optionally a processor set 46. The function pointer 40 may be a pointer to the capability's function in memory. The capability's function may be stored in memory (a memory address space) allocated to the capability 12A. The message mask 42 may indicate which messages are enabled. In an embodiment, each message may be identified by a number, and the message mask 42 may be a bit vector, where each bit in the vector corresponds to the message number of its position within the vector. If the message is permissible, the bit may be a one and if the message is not permissible, the bit may be a zero (or vice versa). In an embodiment, the messages may be randomly distributed among the message numbers so that the messages may not be discovered simply be enumerating from zero. As mentioned previously, if a message is not permissible as indicated in the message mask 42, then the message may not be used for the capability 12A, as actors may not be capable of overriding the message mask 42 when it has a message marked as impermissible. If there are multiple function pointers 40, then there may be multiple message masks 42 (one for each function pointer). The dictionary of messages 44 may describe each message, expected format and content, etc. The processor set 46, if included, may specify a subset of the processors in a computer system on which the capability 12A is permitted to execute. If the processor set 46 is not included, the capability 12A may execute on any processor in the system.

FIG. 3 is a block diagram of one embodiment of a channel 50. In the illustrated embodiment, the channel 50 includes one or more capability pointers 52, message masks 54, and optionally an activity field 58. The capability pointers 52 point to capabilities 12 that correspond to the channel 50 (e.g. the capabilities 12 that are executed when a message is transmitted on the channel 50). In an embodiment, a channel 50 may connect to one capability. Other embodiments may permit connection to multiple capabilities called in series or in parallel. For each capability, the channel 50 may include a message mask 54. The message mask 54 may indicate the permissible messages for the corresponding capability as used within the actor to which the channel belongs. The message mask 54 need not be a superset of the message mask 42 for the capability. Instead, the operating system may ensure that the message mask 42 is inherited by the channel 50. That is, the impermissible messages for the channel 50 may be the union of the impermissible messages specified by the message mask 42 for the capability and the impermissible messages specified by the message mask 54.

The activity field 58 may record the activity value for the channel 50. Different activations of the channel 50 may have different activity values. In some cases, an activation of an actor on the channel 50 may inherit the activity of the actor that sends a message on the channel 50. In other cases, a channel 50 may be bound to a particular activity value. Combinations of channels which inherit activity values and which are bound to activity values may be supported in various embodiments.

An activation of an actor may be an instantiation of an actor to process a message. Each activation may have an associated context 20 that is created when the activation begins execution. Once the activation completes execution on the message, the activation terminates (or is "destroyed"). The context 20 may be deleted when the activation is destroyed. A new execution of the actor may then cause a new activation.

FIG. 4 is a block diagram of one embodiment of an actor 51. As mentioned previously, an actor 51 may be a container for one or more capabilities. More specifically, the actor 51 may be a container for Cids 53 for channels to various capabilities 12. The actor 51 may also include an address space 55. In an embodiment, the address space 55 may be a Cid to the memory actor 32, which may provide access to the memory space assigned to the actor 51. In other embodiments, the address space 55 may include a descriptor of the address space (e.g. base address and extent) but may not be modifiable by the actor 51. The capabilities 12 that are employed by the actor 51 may exist in the address space 55. The actor 51 may optionally include a default processor list 57 which may be a list of processors that may be used to execute activations of the actor 51. The processor list 57, if included, may specify a subset of the processors in a computer system on which the actor 51 is permitted to execute. For example, the processor list 57 may include high performance cores if the actor 51 may benefit from such cores. Alternatively, the processor list 57 may include low performance cores if the actor 51 may not benefit from the high performance cores. If the processor list 57 is not included, the actor 50 may execute on any processor in the system. If an actor 50 includes a processor list 57 and the capability or capabilities 12 indicated by the capability pointers 52 included a processor set 46, the processor set 46 may override the processor list 59 for that capability, in an embodiment.

FIG. 5 is a block diagram of one embodiment of a message 60 that may be transmitted between actors in a system. The message may include a Cid field 62, a token field 64, a message type field 66, a message body field 68, and a response Cid 70, which may include resume activity flag in some cases. Various other fields and flags may be included in other embodiments, in addition to those shown in FIG. 5, or any subset of the fields and flags shown in FIG. 5 may be included with other fields and flags in other embodiments.

The Cid and token fields 62 and 64 may carry the aforementioned Cid and token values for the message. The message type field 66 may indicate the type of message, which may be one of the permitted messages indicated by the message masks 42 and 54. The message body field 68 may include the content of the message, which may be interpreted by the receiving actor based on the message type.

The response Cid 70, if included, may indicate a response channel on which the sending actor of the message 60 expects a response. The resume activity flag of the response Cid 70 may indicate whether or not the activity associated with the sending actor is to be resumed in the response message to the message 60. If the resume activity flag indicates resume, the activity associated with the sending actor may be used rather than associating the sending actor with the current activity (the activity of the receiving actor).

If the resume activity flag 70 does not indicate resume activity, the actor may be associated with the current activity when the response to the message 60 is received. In an embodiment, the resume activity flag may be a bit indicating resume activity when set and inherit current activity when clear (or vice-versa). Other embodiments may include a multibit field with encodings that indicate at least resume activity and inherit current activity.

Figure 6:
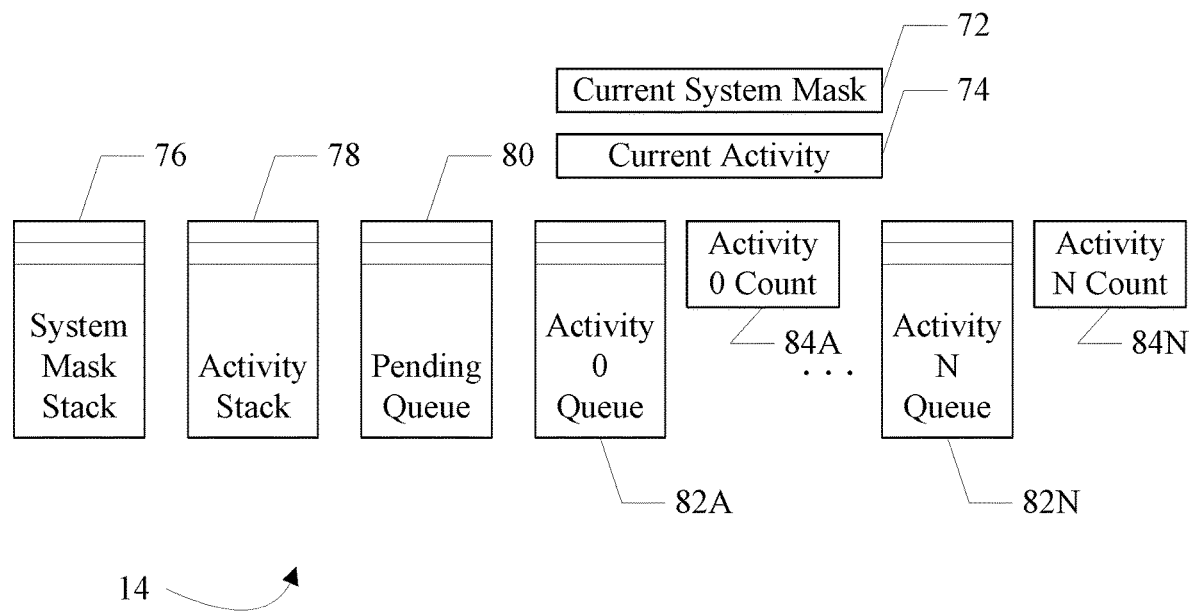
FIG. 6 is a block diagram of data structures related to one embodiment of a scheduling algorithm in accordance with the present disclosure.

FIG. 6 is a block diagram of one embodiment of the activity data structure 14 and state that may be employed in one embodiment of using activities to schedule code for execution. In the illustrated embodiment, the data structures/ state include a current system mask 72, a current activity 74, a system mask stack 76, an activity stack 78, a pending queue 80, and activity queues 82A-82N and corresponding activity counts 84A-84N. There may be an activity queue 82A-82N and activity count 84A-84N for each activity/ activity value in the system. Other embodiments may use other data structures in addition to those shown in FIG. 6 and/or any subset of those shown in FIG. 6.

The current system mask 72 may indicate which activities in the system are masked by the current activity value 74 and any activity values that are enabled but have been preempted. That is, the current system mask 72 may be the union of the masks for the enabled activities. The system mask 72 may include a bit for each activity value that indicates whether or not the activity value is masked (e.g. set if masked and clear if not masked, or vice-versa).

The current activity 74 may be the activity value for which actors are currently in execution. That is, the current activity 74 may be the most recently preempting activity. Unless the current activity 74 is preempted by another activity value that is not masked, the activations associated with the current activity 74 may complete before the current activity 74 changes to one of the previously-preempted activities.

The system mask stack 76 may be a stack of system masks corresponding to activity values that have been preempted. The activity stack 78 may similarly be a stack of the previously-preempted activity values. Thus, each entry in the system mask stack 76 may correspond to the same entry (relative to the top of the stack) in the activity stack 78. The system mask in the system mask stack that corresponds to a given activity value in the activity stack 78 may be the system mask that was the current system mask 72 when the given activity value was preempted. Accordingly, the system mask in the system mask stack 72 that corresponds to the given activity value reflects the given activity value and those activity values that are below the given activity value in the activity stack 78. When an activity value is preempted, the activity value for the current activity 74 may be pushed onto the activity stack 78 and the current system mask 72 may be pushed onto the system mask stack 76. When an activity value's activations have completed (e.g. the activity queue 82A-82N associated with the activity is empty), the top of the system map stack 76 may be popped into the current system mask 72 and the top of the activity stack 78 may be popped into the current activity 74.

The pending queue 80 may store indications of activations that have activity values that are not enabled and are masked at the time a message causing the activation is received. Such activations may remain pending until the activity value is unmasked in the current system mask 72.

Activations of actors that have been scheduled for a given activity value may be indicated in the activity queue 82A-82N associated with the given activity value, in the order that the activations were scheduled. The indication may take any form (e.g. a pointer to the actor or the function/ capability in the actor that is to be activated, etc.). The activity count 84A-84N associated with the given activity value may indicate the number of queued activations (and may also include activations that are currently in execution, if any).

Figure 7:
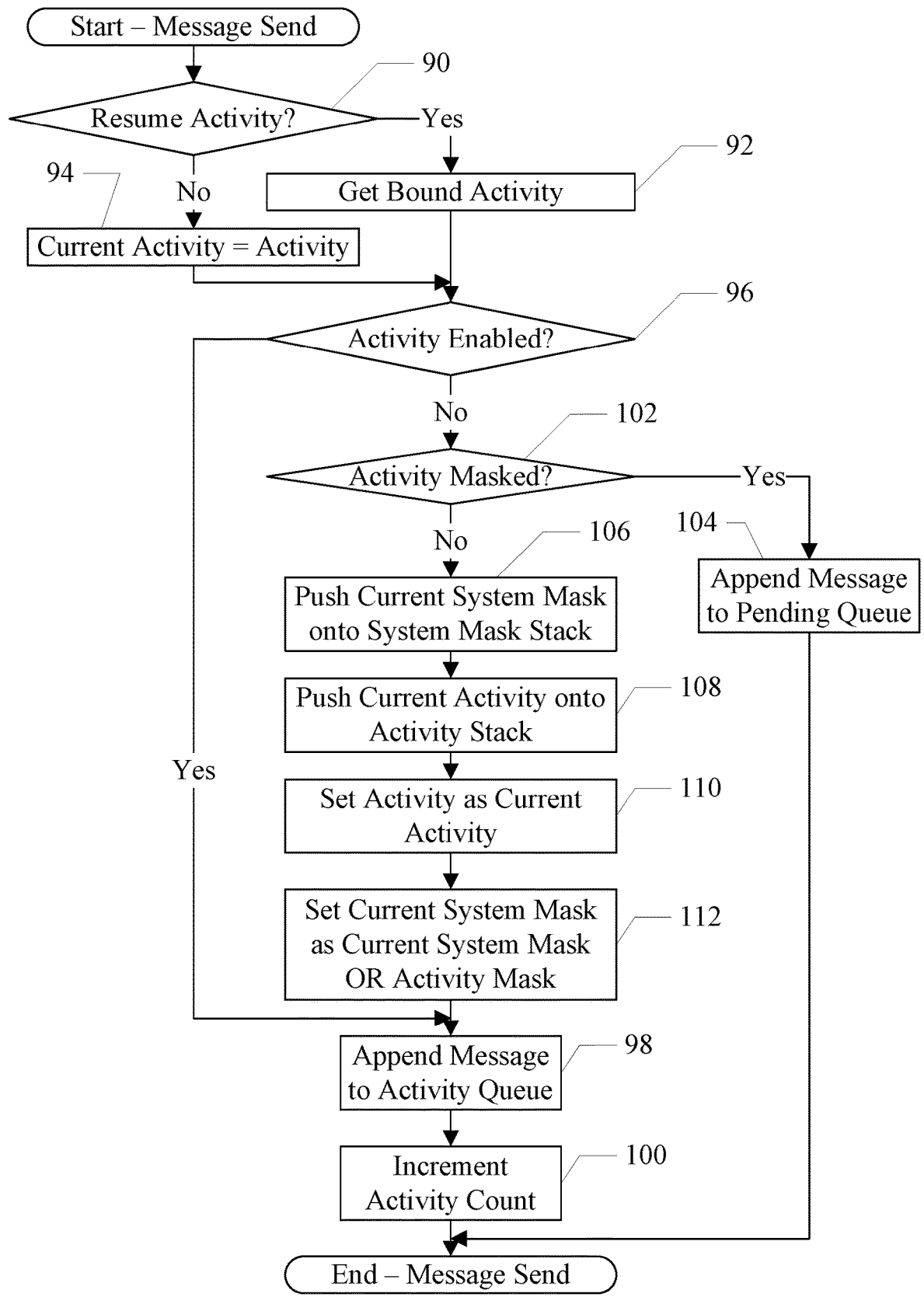
FIG. 7 is a flowchart illustrating one embodiment of message transmission between actors.

FIG. 7 is a flowchart illustrating one embodiment of routing a sent message to a target actor (e.g. by the channel actor 36). While the blocks are shown in a particular order for ease of understanding, other orders may be used. The channel actor 36 may include instructions which, when executed in a computer system, may implement the operation shown in FIG. 7. That is, the channel actor 36 may be configured to implement the operation shown in FIG. 7. FIG. 7 may be executed in response to transmission of the message by a source actor. For example, a Syscall instruction may be executed by the source actor to transmit the message. The Syscall instruction may cause an exception in the source actor, which may be routed to the channel actor 36. Other embodiments may employ other mechanisms (e.g. shared memory polled by the channel actor 36, interprocessor interrupts, etc.). Generally, any actor may be the target actor for a message. The target actor may be the actor which is to receive the message and act on the message. Similarly, any actor may be a source actor for a message on a channel for which the actor has been given a Cid. The source actor is the transmitter of the message.

If the resume activity flag in the Cid of the message indicates that the activity of the target actor of the message is to be resumed (decision block 90, "yes" leg), the channel actor 36 may obtain the bound activity for the channel 50 (e.g. from the activity field 58) (block 92). If the resume activity flag of the message indicates inherit the current activity (decision block 90, "no" leg), the channel actor 36 may use the current activity value as the activity for the target actor (block 94). The target actor may be the actor that will be activated by the channel actor 36 to receive the message.

If the activity is enabled (decision block 96, "yes" leg), the channel actor 36 may append an indication of the message and corresponding activation to the activity queue 82A-82N associated with the activity value (block 98). The channel actor 36 may also increment the activity count 84A-84N associated with the activity value (block 100).

If the activity value is not enabled and is masked according to the current system mask 72 (decision block 96, "no" leg and decision block 102, "yes" leg), the activity value may not become enabled until it is unmasked. Accordingly, the channel actor 36 may append an indication of the activation/message to the pending queue 80 (block 104).

If the activity value is not enabled and is not masked (decision block 96, "no" leg and decision block 102, "no" leg), the activity value may preempt the current activity value. The channel actor 36 may push the current system mask 72 on to the system mask stack 76 (block 106) and may push the current activity 74 onto the activity stack 78 (block 108). The channel actor 36 may set the current activity 74 to the activity value of the message/activation (block 110) and may set the current system mask 72 to the logical OR of the current system mask 72 and the activity mask associated with the activity value (block 112). A table or other data structure may store activity values and activity masks (the mask of activity values that are inhibited by corresponding activity value) for access by the channel actor 36. In this embodiment, mask bits are set to indicate inhibited. Other embodiments may use clear bits to indicate inhibited and a logical AND may be performed. More generally, the union of the current system mask and the activity mask may be made. The channel actor 36 may append an indication of the message and corresponding activation to the activity queue 82A-82N associated with the activity value (block 98). The channel actor 36 may also increment the activity count 84A-84N associated with the activity value (block 100).

The indication of the message/activation in the activity queues 82A-82N and the pending queue 80 may be any identifier that may be used to locate the message/activation. For example, the indication may be a pointer to the message/activation. Alternatively, the queues 82A-82N and the pending queue 80 may store the message.

As mentioned above, any mechanism may be used by the source actor to transmit a message. If the Syscall mechanism is used, the Syscall instruction may be included at the point in the code sequence that the actor wishes to transmit a message. The Syscall instruction may a valid instruction that a user space thread is not permitted to execute (e.g. it may be a privileged instruction and the actors may generally be executing in user space). In another embodiment, the Syscall instruction may be an invalid instruction. Generally, an exception may be any mechanism in a processor executing code that causes the processor to interrupt code execution at the instruction for which the exception occurs, save some amount of processor state, and vector to a known address associated with the exception at which the exception may be handled. In general, exception handling may include remedying the situation that caused the exception so that the instruction may be reexecuted without exception, or terminating the thread for which the exception occurred. In an embodiment, the exception for the Syscall instruction may be handled by transmitting the message that has been created by the actor in which the exception was detected.

Figure 8:
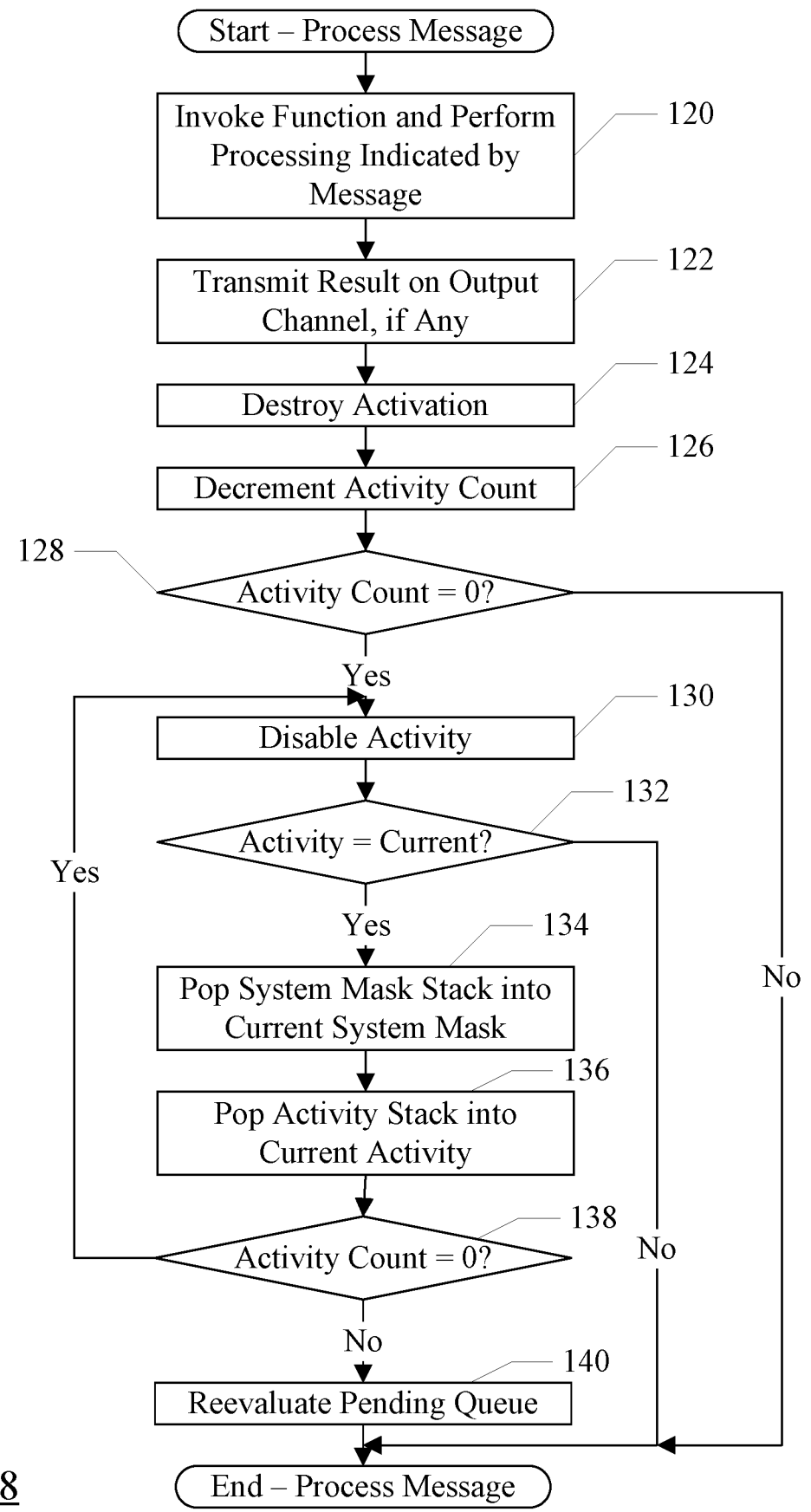
FIG. 8 is a flowchart illustrating one embodiment of message processing.

FIG. 8 is a flowchart illustrating one embodiment of processing a message (e.g. by the channel actor 36 and a target actor of the message). While the blocks are shown in a particular order for ease of understanding, other orders may be used. The channel actor 36/target actor may include instructions which, when executed in a computer system, may implement the operation shown in FIG. 8. That is, the channel actor 36/target actor may be configured to implement the operation shown in FIG. 8.

The operation shown in FIG. 8 may be performed responsive to the message and associated activation reaching the head of the activity queue 82A-82N for the current activity value 74, for example. The operation may also be performed in response to resuming an activity due to a message from another activity level with the resume activity flag 70 set. The channel actor 36 may invoke the function in the target actor that is to perform the processing indicated by the message (e.g. the channel to the capability may be that includes the function may be used to invoke the function) (block 120). The target actor may process the message, and may optionally transmit a result on an output channel, in some cases (block 122). The target actor may then terminate, destroying the activation (block 124). In response, the channel actor 36 may decrement the activity count 84A-84N associated with the activity value for the activation (block 126). If the decremented activity count has not reached zero (decision block 128, "no" leg), there are more activations to process associated with the activity value and thus no changes need to be made at this point for this embodiment.

If the activity count is zero (decision block 128, "yes" leg), the activity is complete and may be disabled (block 130). If the activity value is the current activity value 74 (decision block 132, "yes" leg), the channel actor 36 may pop the system mask stack 76 into the current system mask 72 and the activity stack 78 into the current activity 74 (blocks 134 and 136). If the activity count 84A-84N for the popped current activity is also zero (decision block 138, "yes" leg), the channel actor 36 may disable the popped activity as well (block 130) and may repeat blocks 134 and 136 to pop the next activity from the stacks 76 and 78. If the activity count 84A-84N for the popped current activity is not zero (decision block 138, "no" leg), the channel actor 36 may reevaluate the pending queue 80 for activations/messages that have an unmasked activity value (block 140). Activations/messages that are moved to an activity queue 82A-82N may enable the corresponding activity value (if not already enabled).

It is noted that, in embodiments in which long lived threads are used instead of activation/dissolve sequences, the operation illustrated in FIG. 8 may still pertain. The destruction of the activation (block 124) may be replaced with the blocking of the thread (and the activity count may be decremented due to the thread blocking).

Figure 9:
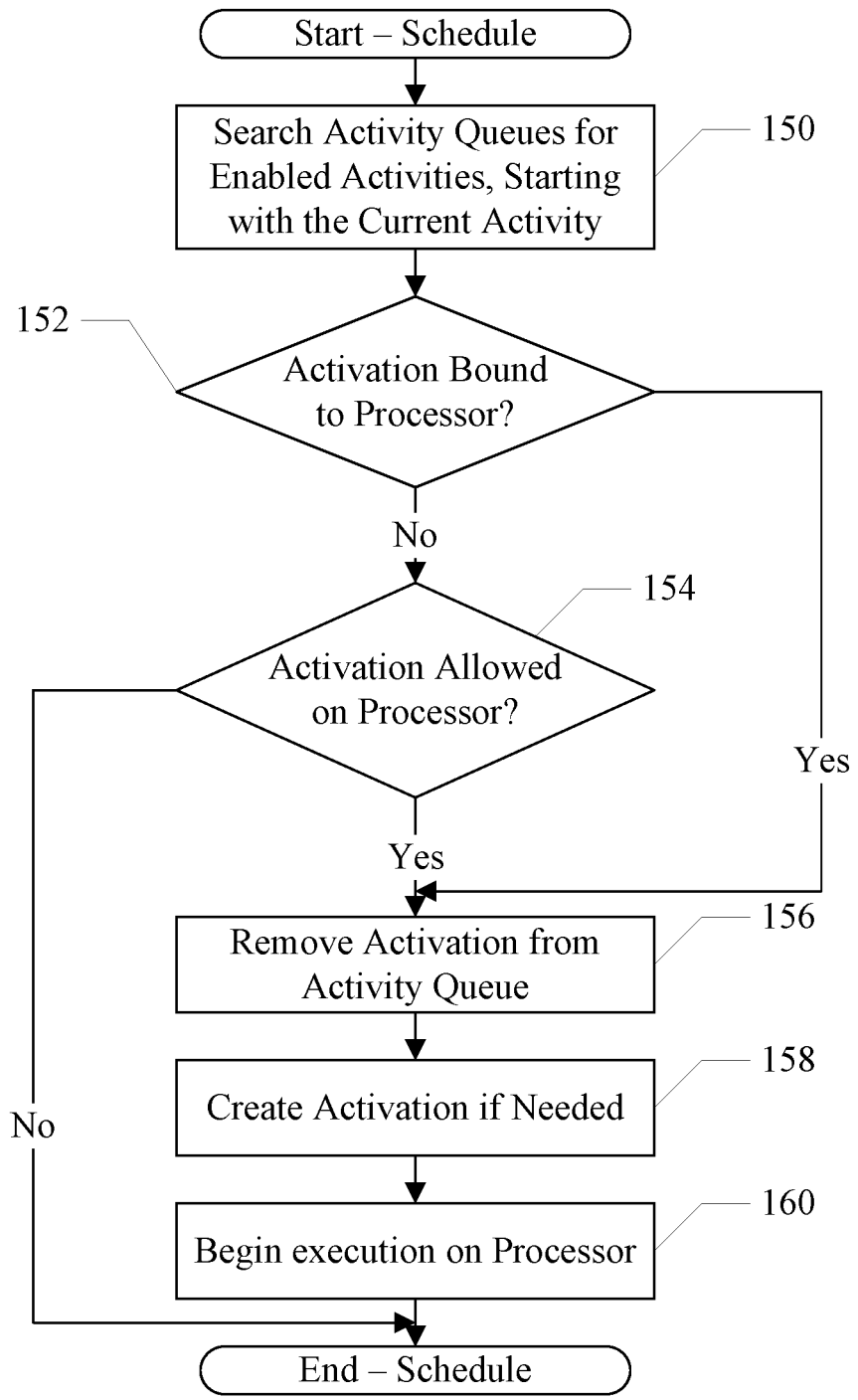
FIG. 9 is a flowchart illustrating operation of one embodiment of scheduling an activation to execute on a CPU.

FIG. 9 is a flowchart illustrating scheduling operation for one embodiment. The scheduling may be performed by the kernel 10 or the channel actor 36, in various embodiments, or even by a different actor, or a combination of one or more of the above. Generally, the operation illustrated in FIG. 9 may be performed when a processor in the system becomes available to execute an actor (e.g. when a different actor has completed execution, or if multiple actors share a CPU via time slice scheduling and a slice opens for execution, etc.). While the blocks are shown in a particular order for ease of understanding, other orders may be used. The channel actor 36 (or other kernel 10 or other actor) may include instructions which, when executed in a computer system, may implement the operation shown in FIG. 9. The channel actor 36 will be used as an example in FIG. 9, but any actor or kernel 10 or combination thereof may be used in other embodiments. That is, the channel actor 36/kernel 10/other actor may be configured to implement the operation shown in FIG. 9.

The channel actor 36 may search the activity queues 82A-82N corresponding to the enabled activity values, beginning with the current activity value 74 and progressing down the activity stack 78 in order from the top of the stack to the bottom (block 150). If an activation bound to the processor is located (decision block 152, "yes" leg), the activation may be selected for execution by the processor. An activation may be bound to a processor, for example, if the activation was previously scheduled on the processor and was preempted. In an embodiment, a given activity value may be bound to a given processor when an initial activation associated with the given activity value is scheduled on the given processor. Other embodiments may not bind activity values or activations to processors, if desired. Alternatively, if an activation is permitted on the processor (e.g. the processor is part of the processor set 46 or 59 associated with the activation, or there are no restrictions on the activation's execution—decision block 154, "yes" leg), the activation may be selected for execution by the processor. If neither case is true (decision blocks 152 and 154, "no" legs), the processor may be idle until an activation that may be executed is discovered.

The indication of the selected activation may be removed from the activity queue 82A-82N associated with the activity value of the selected activation (block 156). The activity count may not be updated, however, in this embodiment, as the selected activation has not yet completed execution. If the activation has not yet been created (e.g. the kernel 10 has no context for the activation), the activation may be created (block 158). The processor may begin execution of the activation (block 160).

Figure 10:
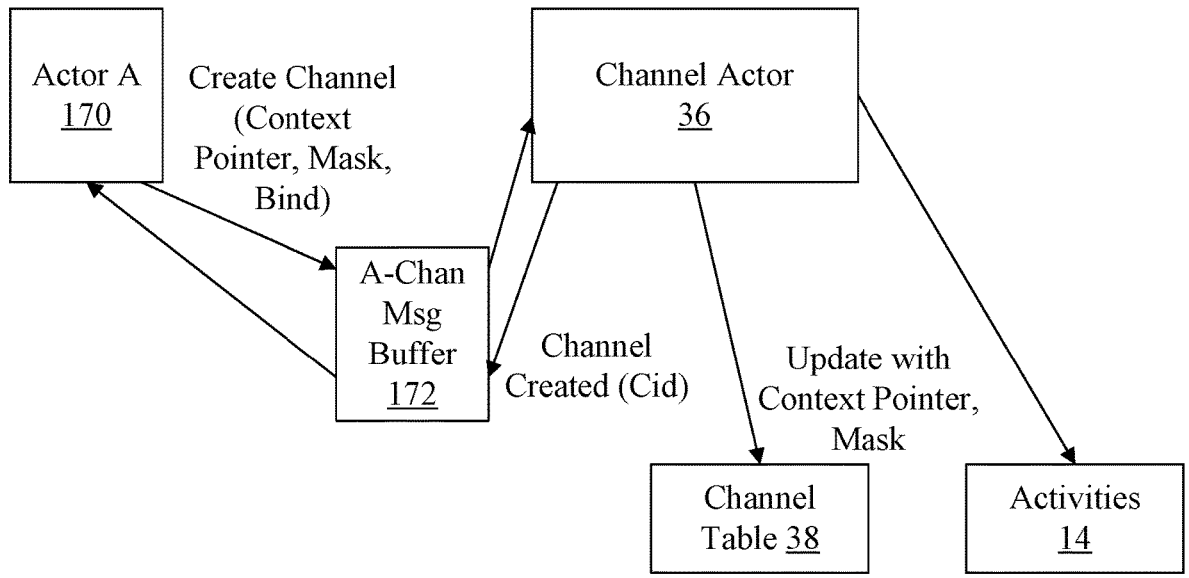
FIG. 10 is a block diagram of one embodiment of channel creation.
Figure 11:
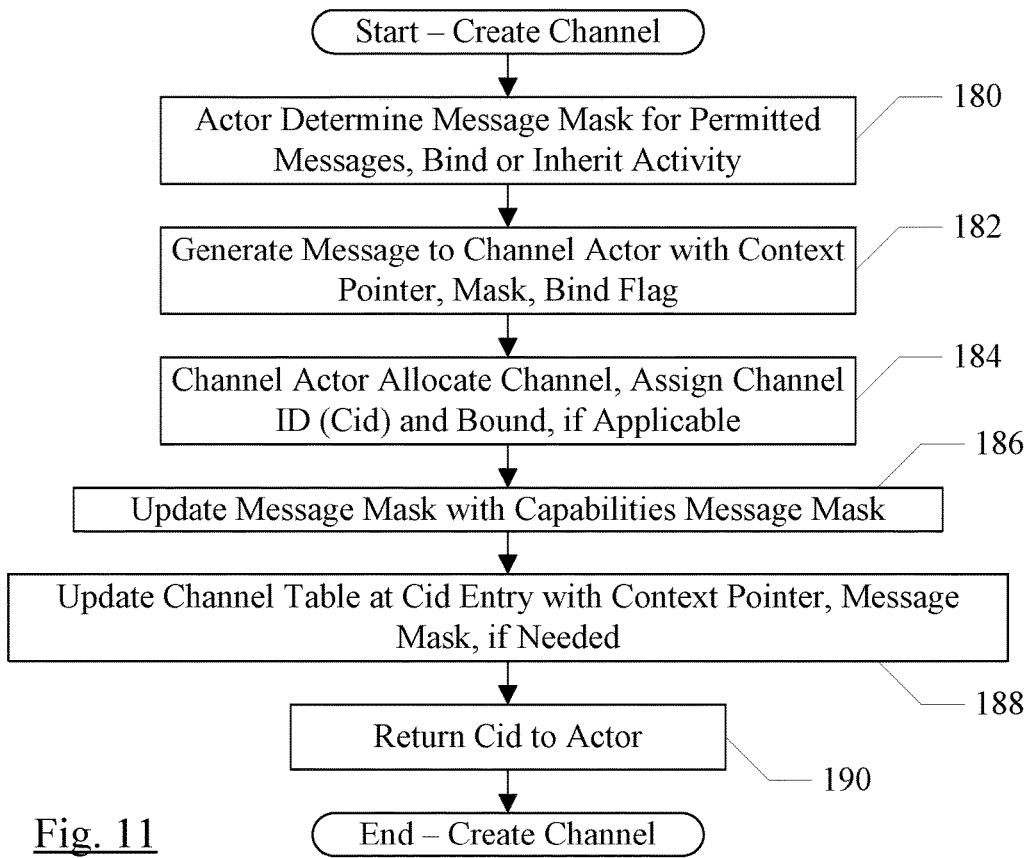
FIG. 11 is a flowchart illustrating operation of one embodiment of a system during channel creation.

FIG. 10 illustrates one embodiment of the passing of messages from an actor 170 (which may be any of the actors 16A-16B, 30, 32, 34, and/or 36 shown in FIGS. 1 and 2 and may have the structure of FIG. 4) to the channel actor 36 to create a channel. FIG. 11 is a corresponding flowchart illustrating operation of one embodiment of the actor 170 and the channel actor 36 to create a channel. While the blocks are shown in a particular order for ease of understanding, other orders may be used. The actor 170 and/or the channel actor 36 may include code which, when executed, implements the operation shown in FIGS. 10 and 11.

The actor 170 may determine that a new channel is desired, and may generate a message to the channel actor 36 to create the channel. The channel actor 36 may define a create channel message which may be used on a channel between the actor 170 and the channel actor 36 to create a channel. In an embodiment, the actor 170 may determine which function (capability 12 or additional function 56, if applicable) is to be called when a message is received on the channel, as well as a message mask for permitted messages on the channel (block 180, FIG. 11). Additionally, the actor 170 may determine if the channel is to be bound to a particular activity, or if it will inherit the activity of the message sender. If the channel is to be bound, the bind property may be specified in the channel creation message as well. A message sent on an inherit channel may be have activity value of the sending actor, whereas a message sent on a bind channel may have the bound activity value. The bound activity value may not be specified at the channel creation, but rather may be bound at message send time, in an embodiment. During channel creation, the bind property is used to indicate that the channel will be bound to an activity value.

A context pointer for the function, or for the actor 170 itself, may be provided in the create channel message, along with the message mask and bind flag (block 182, FIG. 11). The context pointer may be the above-mentioned token, or the actor 170 may separately include a token as well, in various embodiments. The actor 170 may pass the message to the channel actor 36. In one embodiment, the message may be passed through a shared memory area shown as a message buffer 172. A shared memory area may be a region of memory that is accessible (e.g. readable and/or writeable) to both the actor 170 and the channel actor 36. In some embodiments, the shared memory area may be a stack that is used by the processor executing the actor 170, and the area may be accessible because the actor 170 may have an exception to transmit the message (e.g. the message may be written to the stack and then the actor 170 may execute a system call (Syscall) instruction that causes the exception). In an embodiment, the Syscall instruction may be an illegal instruction. In another embodiment, the Syscall instruction may be a privileged instruction and since the actors execute in user space, the Syscall instruction may cause an exception.

The channel actor 36 may read the buffer 172 and decode the create channel message. The channel actor 36 may allocate a channel for the actor 170 and assign a channel ID (Cid) to the channel (block 184, FIG. 11). The channel actor 36 may also update the message mask provided from the actor 170 with the message mask from the corresponding capability, if applicable (block 186, FIG. 11). The channel actor 36 may take the union of the message masks, and thus a message may be permitted only if it is permitted by both message masks. The channel actor 36 may update the channel table 38 with the data identifying the channel (e.g., Cid, context pointer, token (if separate), updated message mask, etc.) (block 188, FIG. 11). If a new activity value is created to bind to the channel, the channel actor 36 may update the activities data structure 14 as well. The channel actor 36 may return the Cid to the actor 170 (e.g. through the buffer 172 as a channel created message) (block 190, FIG. 11).

Figure 12:
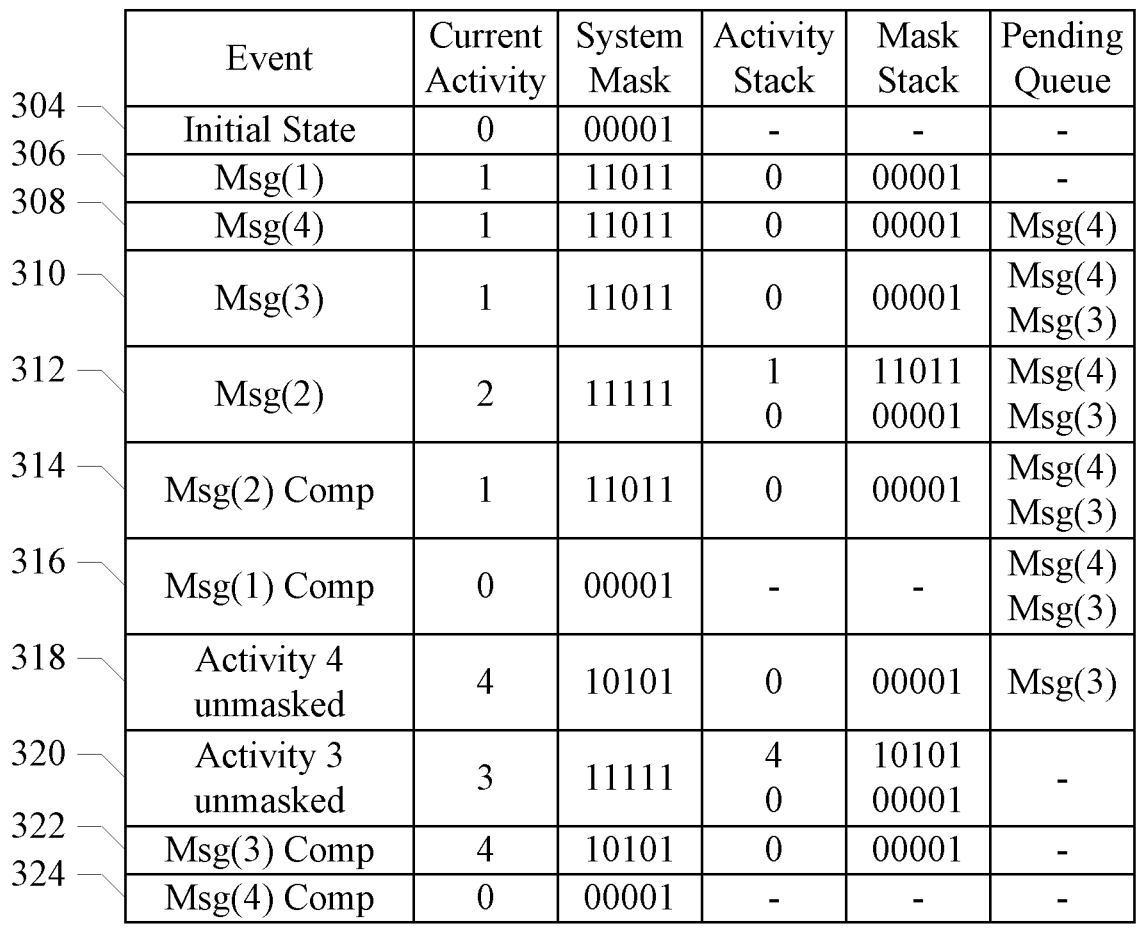
FIG. 12 is a block diagram of an example of one embodiment of activities.

FIG. 12 is a block diagram illustrating an example of scheduling via activity values. In FIG. 12, an example set of activity values 0 to 4 are shown, along with activity masks for each activity (reference numeral 300). Additionally, a table 302 is shown illustrating an example set of events and the operation of the scheduling system.

As illustrated in FIG. 12, the activity masks are bit vectors in this example, with set bits indicating which other activity values are masked a given activity values. Thus, activity value 4 masks activity values 4 and 2; activity value 3 masks activity values 3 and 1; activity value 2 masks activity value 2; activity value 1 masks activity values 4, 3, and 1; and activity value 0 masks activity value 0. There may be more or fewer activity values in other examples.

As can be seen in FIG. 12, each activity value may mask itself. This may prevent an activity value from preempting itself, or preempting once the activity value is enabled. Such masking may aid in ensuring that there are no deadlocks in the scheduling mechanism. Also, as can be seen in FIG. 12, the numerical value of the activity value may not be an indication of priority (e.g. activity value 1 masks activity values 4 and 3, while activity value 4 masks activity 2, so larger numerical values can mask smaller ones and vice-versa).

Each row in the table 302 may represent an event, and the events occur in time order from top to bottom in table 302. Each row may indicate the event ("event" heading), the current activity 74 in response to the event ("current activity" heading), the current system mask 72 in response to the event ("system mask" heading), the activity stack 78 contents ("activity stack" heading), the system mask stack 76 contents ("mask stack" heading), and the pending queue 80 contents ("pending queue" heading).

An initial state of the system is shown at reference numeral 304, including a current activity value of 0 and the system mask equal to the activity mask for activity value 0. The activity stack 78, the system mask stack 76, and the pending queue 80 are empty.

A first message is received with activity value 1 (reference numeral 306). Since activity value 1 is not masked by the current system mask, the activity value 1 preempts activity value 0. The current activity 74 is updated to activity value 1, and the current system mask 72 is updated to the OR of the previous system mask and the activity mask for activity value 1. The activity value 0 is pushed onto the activity stack 78 and the associated current system mask is pushed on the system map stack 76.

Subsequently, a second message is received with activity value 4 (reference numeral 308). Since the current system mask 72 masks activity value 4, the message is inserted into the pending queue 80. Similarly, a message received with activity value 3 is and is masked, so it is placed in the pending queue 80 (reference numeral 310). The current system mask 72, the current activity 74, the system mask stack 76, and the mask stack 78 remain unchanged.

In response to receiving a message with the activity value of 2 (reference numeral 312), which is not masked by the current system mask 72 at the time of receipt, the activity value of 2 preempts and the current activity 74 is updated to 2. The current system mask 72 is updated to include the activity mask for activity 2, leading to a current system mask 72 that blocks all activity values. The activity value of 1 is pushed onto the activity stack 78 and the corresponding system mask (the union of the activity 0 and activity 1 system masks) is pushed onto the mask stack 78.

When processing in activity 2 completes (reference numeral 314), the current activity value 74 is popped from the activity stack 78 and the current system mask 72 is popped from the system mask stack 76, restoring the activity value of 1 and the corresponding system mask. The processing at activity value 1 completes (reference numeral 316), similarly popping the current activity value 74 from the activity stack 78 and the current system mask 72 from the system mask stack 76, restoring the activity value of 0 and the corresponding system mask. Since the activity value of 4 is now unmasked and the pending queue 80 has a message for that activity value at the head of the queue, the activity value of 4 preempts (reference numeral 318), again pushing the activity value of 0 and the corresponding system mask to the activity stack 78 and the system mask stack 76, respectively. The current activity value 74 is updated to 4, and the current system mask is the OR of the system mask associated with activity 0 and the activity mask associated with the activity value of 4. The message with the activity value of 4 may be moved from the pending queue to the activity queue 82A-82N associated with the activity value of 4.

The activity value of 3 remains unmasked after the preemption by the activity value of 3, and the presence of the message with the activity value of 3 in the pending queue 80 causes the activity value of 3 to preempt (reference numeral 320). The activity value of 4 and the corresponding system mask are pushed to the activity stack 78 and the system mask stack 76, respectively. The current activity 74 is updated to 3 and the current system mask 72 is updated to the OR of the previous system mask and the mask for the activity value of 3. The message with the activity value of 3 may be moved from the pending queue to the activity queue 82A-82N associated with the activity value of 3.

Subsequently, the message with the activity value of 3 is processed (reference numeral 322). The current activity 74 is popped from the activity stack 78 (activity value 4) and the current system mask 72 is popped from the system mask stack 76. The message with the activity value of 4 is processed (reference numeral 324), similarly popping the current activity 74 from the activity stack 78 (activity value 0) and the current system mask 72 from the system mask stack 76. The system in the example has returned to its initial state.

Figure 13:
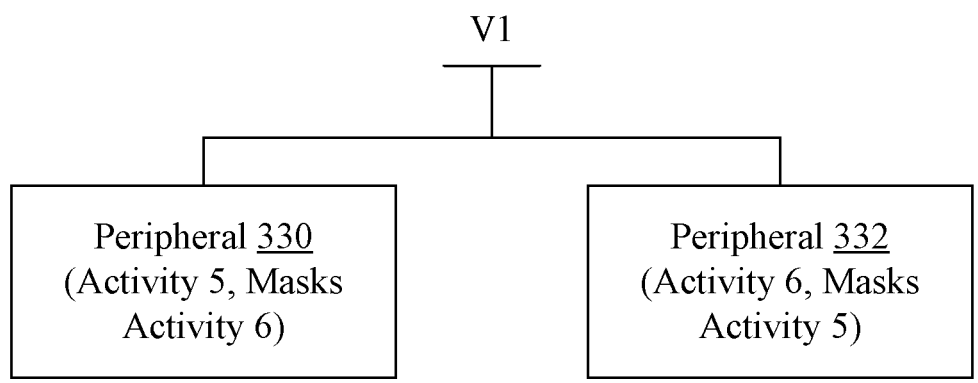
FIG. 13 is a block diagram of one embodiment of a pair of hardware devices and associated activities that mask each other.

While the above examples have referred to various software scheduling and execution using the activity scheduling mechanism described herein, activity scheduling may be used to ensure correct hardware operation as well. For example, FIG. 13 is a block diagram of one embodiment of a pair of hardware devices (e.g. peripherals 330 and 332). The peripherals 330 and 332 are powered by the same power supply voltage V1. The voltage regulator (not shown) that generates the power supply voltage V1 may be capable of supplying the power needs of the one or the other of peripherals 330 and 332, but may not be capable of supplying both peripherals 330 and 332 concurrently (at least for some cases of the load currents from the peripherals 330 and 332).

As illustrated in FIG. 13, the peripheral 330 may be assigned to an activity value of 5, and the activity mask associated with the activity value of 5 may include masking of the activity value of 6. The peripheral 332, on the other hand, may be assigned to the activity value of 6 and may mask the activity value of 5. Accordingly, whichever of the peripherals 330 and 332 is used first may power up, and may block the other peripheral 330 or 332 from powering up. Once the currently-active peripheral 330 or 332 powers down, the other peripheral 330 or 332 may be unmasked and may be powered up if used. Thus, the peripherals 330 and 332 are mutually exclusive through the activity values and corresponding activity masks.

While power conflict was used as an example in the above discussion, activity masking may be used to manage other resource conflicts besides power. For example, peripherals that use a common interrupt line or port, but are not designed to share the resource, may be included in the same system if the activity mechanism mentioned above is used.

Figure 14:
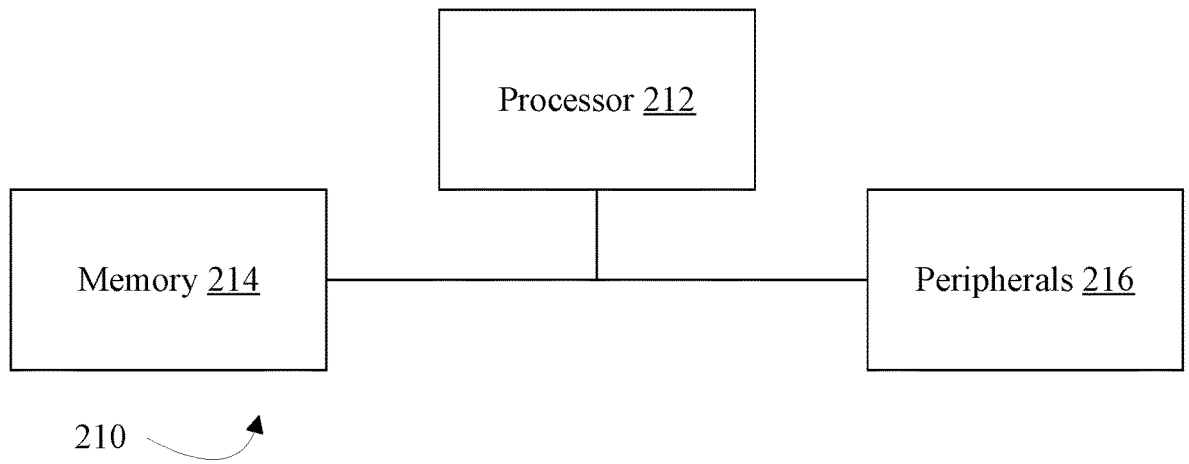
FIG. 14 is a block diagram of one embodiment of a computer system.

Tuning now to FIG. 14, a block diagram of one embodiment of an exemplary computer system 210 is shown. In the embodiment of FIG. 14, the computer system 210 includes at least one processor 212, a memory 214, and various peripheral devices 216. The processor 212 is coupled to the memory 214 and the peripheral devices 216.

The processor 212 is configured to execute instructions, including the instructions in the software described herein such as the various actors, capabilities functions, and/or the kernel. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor. The processor 212 may be the CPU (or CPUs, if more than one processor is included) in the system 210. The processor 212 may be a multi-core processor, in some embodiments.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridges may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Figure 15:
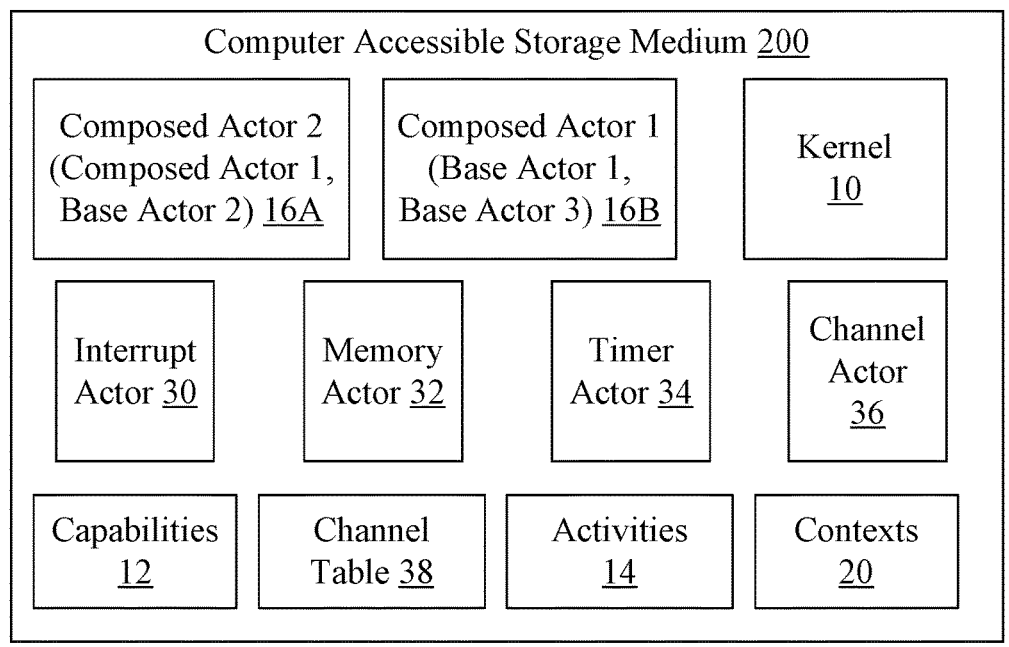
FIG. 15 is a block diagram of one embodiment of a computer accessible storage medium.

Peripheral devices 216 may represent any sort of hardware devices that may be included in the computer system 210 or coupled thereto (e.g. storage devices, optionally including a computer accessible storage medium 200 such as the one shown in FIG. 15 and/or the peripherals 330 and 332 shown in FIG. 13), other input/output (I/O) devices such as video hardware, audio hardware, user interface devices, networking hardware, various sensors, etc.). Peripheral devices 216 may further include various peripheral interfaces and/or bridges to various peripheral interfaces such as peripheral component interconnect (PCI), PCI Express (PCIe), universal serial bus (USB), etc. The interfaces may be industry-standard interfaces and/or proprietary interfaces. In some embodiments, the processor 212, the memory controller for the memory 214, and one or more of the peripheral devices and/or interfaces may be integrated into an integrated circuit (e.g. a system on a chip (SOC).

The computer system 210 may be any sort of computer system, including general purpose computer systems such as desktops, laptops, servers, etc. The computer system 210 may be a portable system such as a smart phone, personal digital assistant, tablet, etc. The computer system 210 may also be an embedded system for another product.

FIG. 15 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 15 may store code forming the various actors 16A-16B, 30, 32, 34, and 36, the kernel 10, and/or the functions in the capabilities 12. The computer accessible storage medium 200 may still further store one or more data structures such as the channel table 38, the contexts 20, and/or the activities data structures 14. The various actors 14A-14C, 30, 32, 34, and 36, the kernel 10, and/or the functions in the capabilities 12 may comprise instructions which, when executed, implement the operation described above for these components. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer accessible storage medium storing a plurality of instructions that are computer-executable, the plurality of instructions comprising:
    a plurality of independently-schedulable code sequences; and
    a first code sequence that schedules the plurality of independently-schedulable code sequences to execute on one or more processors in a system, wherein the first code sequence schedules a second code sequence of the plurality of independently-schedulable code sequences to execute responsive to the second code sequence being ready to execute, a first activity value associated with the second code sequence, and a current activity mask that indicates which activity values are currently masked in the system, wherein the first code sequence schedules the second code sequence to execute dependent on the first activity value not being masked by the current activity mask, and wherein the activity values lack an inherent priority with respect to other activity values and the activity masks control the ability to preempt or not preempt at a given point in time, and wherein scheduling the second code sequence includes the first code sequence preempting a current activity in the system, updating the current activity mask with a first activity mask associated with the first activity value, and setting the current activity to the first activity value.

2. The non-transitory computer accessible storage medium as recited in claim 1 wherein updating the current activity mask comprises taking a union of the current activity mask and the first activity mask.

3. The non-transitory computer accessible storage medium as recited in claim 1 wherein the first code sequence inhibits scheduling the second code sequence responsive to the first activity value being masked.

4. The non-transitory computer accessible storage medium as recited in claim 3 wherein the first code sequence inserts an indication of the second code sequence in a pending queue responsive to the first activity value being masked.

5. The non-transitory computer accessible storage medium as recited in claim 1 wherein, prior to updating the current activity mask and setting the current activity, the first code sequence pushes the current activity mask onto a mask stack and the current activity onto an activity stack.

6. The non-transitory computer accessible storage medium as recited in claim 5 wherein the first code sequence maintains an activity count associated with the first activity value, and wherein the first code sequence pops the current activity from the current activity stack and the current activity mask from the mask stack responsive to termination of a given code sequence associated with the first activity value and reducing the activity count to zero.

7. The non-transitory computer accessible storage medium as recited in claim 1 wherein the first activity value is enabled if at least one third code sequence of the plurality of independently-schedulable code sequences was previously scheduled and is not yet complete, and wherein the first code sequence inhibits scheduling the second code sequence responsive to the first activity value being enabled.

8. The non-transitory computer accessible storage medium as recited in claim 1 wherein the second code sequence is ready for execution responsive to a message from a third code sequence of the plurality of independently-schedulable code sequences that targets the second code sequence.

9. A method comprising:
    scheduling, via execution of a first code sequence on a system, a plurality of independently-schedulable code sequences to execute on one or more processors in the system, wherein the scheduling comprises:
        scheduling a second code sequence of the plurality of independently-schedulable code sequences to execute on a first processor of the one or more processors responsive to: the second code sequence being ready to execute, a first activity value associated with the second code sequence, and a current activity mask that indicates which activity values are currently masked in the system;

wherein the first code sequence schedules the second code sequence to execute dependent on the first activity value not being masked by the current activity mask, and wherein the activity values lack an inherent priority with respect to other activity values and the activity masks control the ability of the second code sequence to preempt or not preempt a third code sequence executing on the first processor at a given point in time; and scheduling the second code sequence comprises: the first code sequence preempting a current activity in the system; updating the current activity mask with a first activity mask associated with the first activity value; and setting the current activity to the first activity value.

10. The method as recited in claim 9 wherein updating the current activity mask comprises taking a union of the current activity mask and the first activity mask.

11. The method as recited in claim 9 further comprising inhibiting scheduling a fourth code sequence responsive to a second activity value associated with the fourth code sequence being masked.

12. The method as recited in claim 11 further comprising inserting an indication of the fourth code sequence in a pending queue responsive to the second activity value being masked.

13. The method as recited in claim 9 further comprising, prior to updating the current activity mask and setting the current activity, pushing the current activity mask onto a mask stack and the current activity onto an activity stack.

14. The method as recited in claim 13 further comprising:
maintaining an activity count associated with the first activity value; and
popping the current activity from the current activity stack and the current activity mask from the mask stack responsive to termination of a given code sequence associated with the first activity value and further responsive to reducing the activity count to zero.

15. The method as recited in claim 9 wherein the first activity value is enabled if at least one fifth code sequence of the plurality of independently-schedulable code sequences was previously scheduled and is not yet complete, and the method further comprises inhibiting scheduling the second code sequence responsive to the first activity value being enabled.

16. The method as recited in claim 9 wherein the second code sequence is ready for execution responsive to a message from a sixth code sequence of the plurality of independently-schedulable code sequences that targets the second code sequence.

17. The method as recited in claim 9 wherein the plurality of independently-schedule code sequences comprise a plurality of actors, each actor including one or more capabilities, wherein the plurality of actors communicate by transmitting messages on a plurality of channels, and the first code sequence is a first actor that receives a first message from a second actor to a third actor, the first message associated with the first activity value, and wherein the first actor passes an activation of the third actor to a kernel to be instantiated for execution responsive to the first activity value not being masked by the current system mask that corresponds to previous activity values of previously scheduled activations, and wherein the first actor delays the activation of the third actor responsive to the activation being masked, wherein each given activity value is associated with an activity mask specifying which other activity values are masked by the given activity value.

18. A computer system comprising:
one or more processors; and
a computer accessible storage medium coupled to the one or more processors and storing a plurality of instructions that are executable on the one or more processors, the plurality of instructions comprising:
a plurality of independently-schedulable code sequences; and
a first code sequence that schedules the plurality of independently-schedulable code sequences to execute on one or more processors in a system, wherein the first code sequence schedules a second code sequence of the plurality of independently-schedulable code sequences to execute responsive to the second code sequence being ready to execute, a first activity value associated with the second code sequence, and a current activity mask that indicates which activity values are currently masked in the system, wherein the first code sequence schedules the second code sequence to execute dependent on the first activity value not being masked by the current activity mask, and wherein the activity values lack an inherent priority with respect to other activity values and the activity masks control the ability to preempt or not preempt at a given point in time, and wherein scheduling the second code sequence includes the first code sequence preempting a current activity in the system, updating the current activity mask with a first activity mask associated with the first activity value, and setting the current activity to the first activity value.

19. The computer system as recited in claim 18 wherein the first code sequence inhibits scheduling the second code sequence responsive to the first activity value being masked, and wherein the first code sequence inserts an indication of the second code sequence in a pending queue responsive to the first activity value being masked.

20. The computer system as recited in claim 18 wherein, prior to updating the current activity mask and setting the current activity, the first code sequence pushes the current activity mask onto a mask stack and the current activity onto an activity stack.

* * * * *

UNITED STATES PATENT AND TRADEMARK OFFICE
CERTIFICATE OF CORRECTION

PATENT NO. : 10,929,178 B1
APPLICATION NO. : 16/071634
DATED : February 23, 2021
INVENTOR(S) : Peter H. van der Veen, Shawn R. Woodtke and Stephen J. McPolin Page 1 of 1

It is certified that error appears in the above-identified patent and that said Letters Patent is hereby corrected as shown below:

In the Claims

Claim 17 Line 6 please delete "the current system mask" and insert -- the current activity mask -- in place thereof.

Signed and Sealed this
Twentieth Day of July, 2021

Drew Hirshfeld
*Performing the Functions and Duties of the
Under Secretary of Commerce for Intellectual Property and
Director of the United States Patent and Trademark Office*